United States Patent [19]

van Blerk

[11] 4,204,333

[45] May 27, 1980

[54] SYSTEM AND METHOD FOR CALIBRATING WHEEL ALIGNMENT SYSTEM SENSORS

[75] Inventor: Victor B. van Blerk, San Jose, Calif.

[73] Assignee: Nortron Corporation, Sunnyvale, Calif.

[21] Appl. No.: 942,874

[22] Filed: Sep. 15, 1978

[51] Int. Cl.² .................. G01B 7/315; G01B 19/295; G01B 11/275

[52] U.S. Cl. ................................ 33/288; 33/203.21; 33/336

[58] Field of Search ............... 33/288, 203, 203.12, 33/203.13, 203.15, 203.16, 203.17, 203.18, 203.21, 1 PT, 336, 228; 73/1 R, 1 E

[56] References Cited

U.S. PATENT DOCUMENTS

| 2,795,859 | 6/1957 | Buschbach | 73/1 E |
| 3,913,236 | 10/1975 | Butler | 33/336 |
| 4,106,208 | 8/1978 | Hunter | 33/288 |

Primary Examiner—Willis Little
Attorney, Agent, or Firm—Flehr, Hohbach, Test, Albritton & Herbert

[57] ABSTRACT

A system and method for calibrating a wheel alignment system to provide a compensating offset with respect to error from sensor devices involved therein.

6 Claims, 8 Drawing Figures

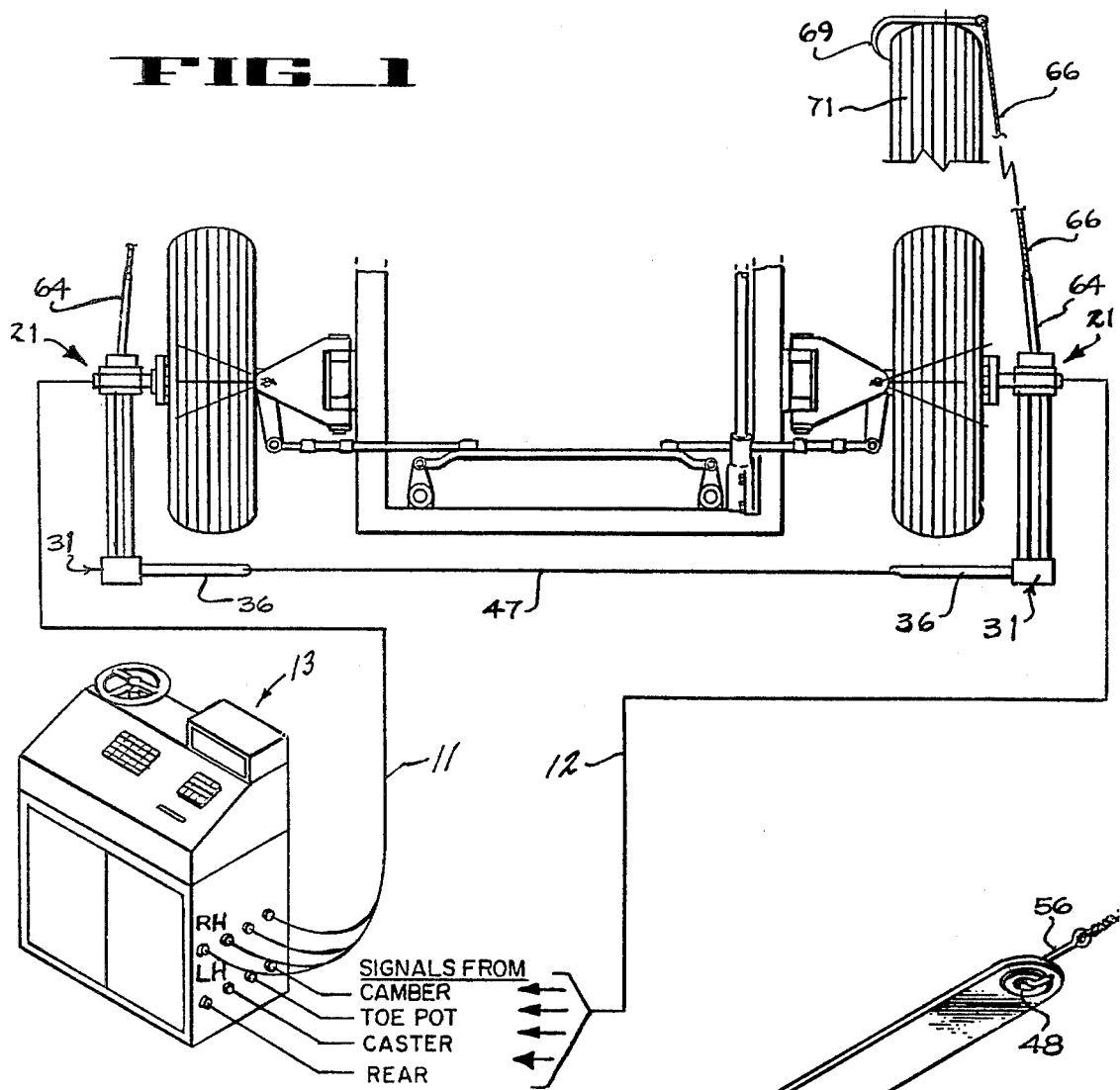
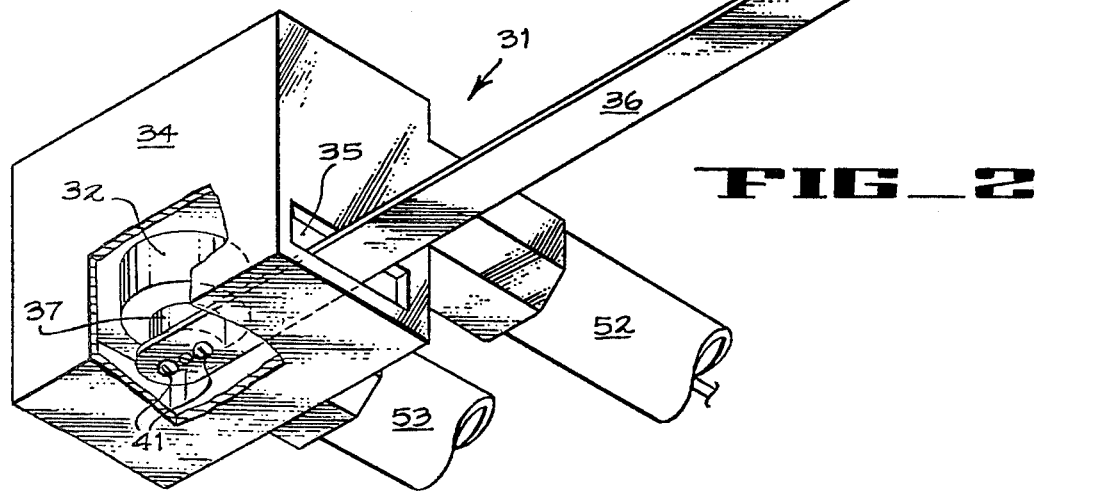

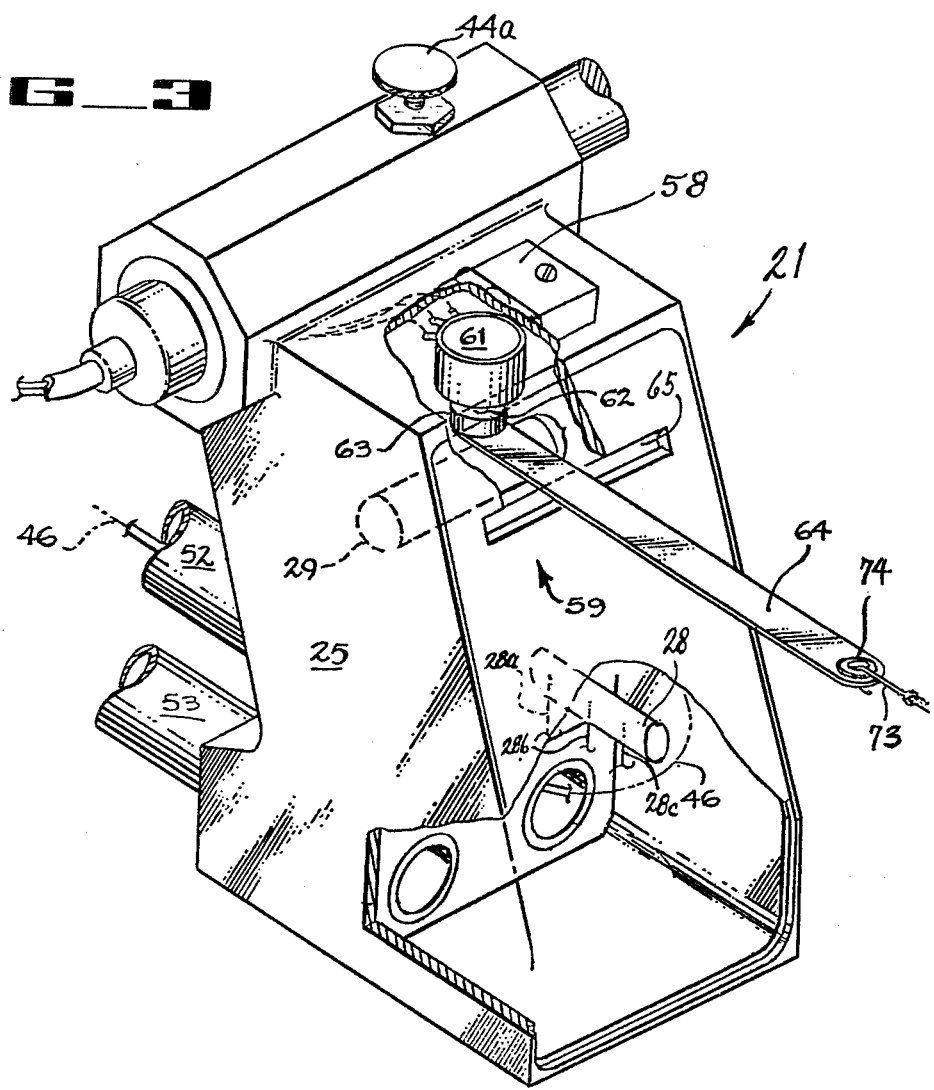

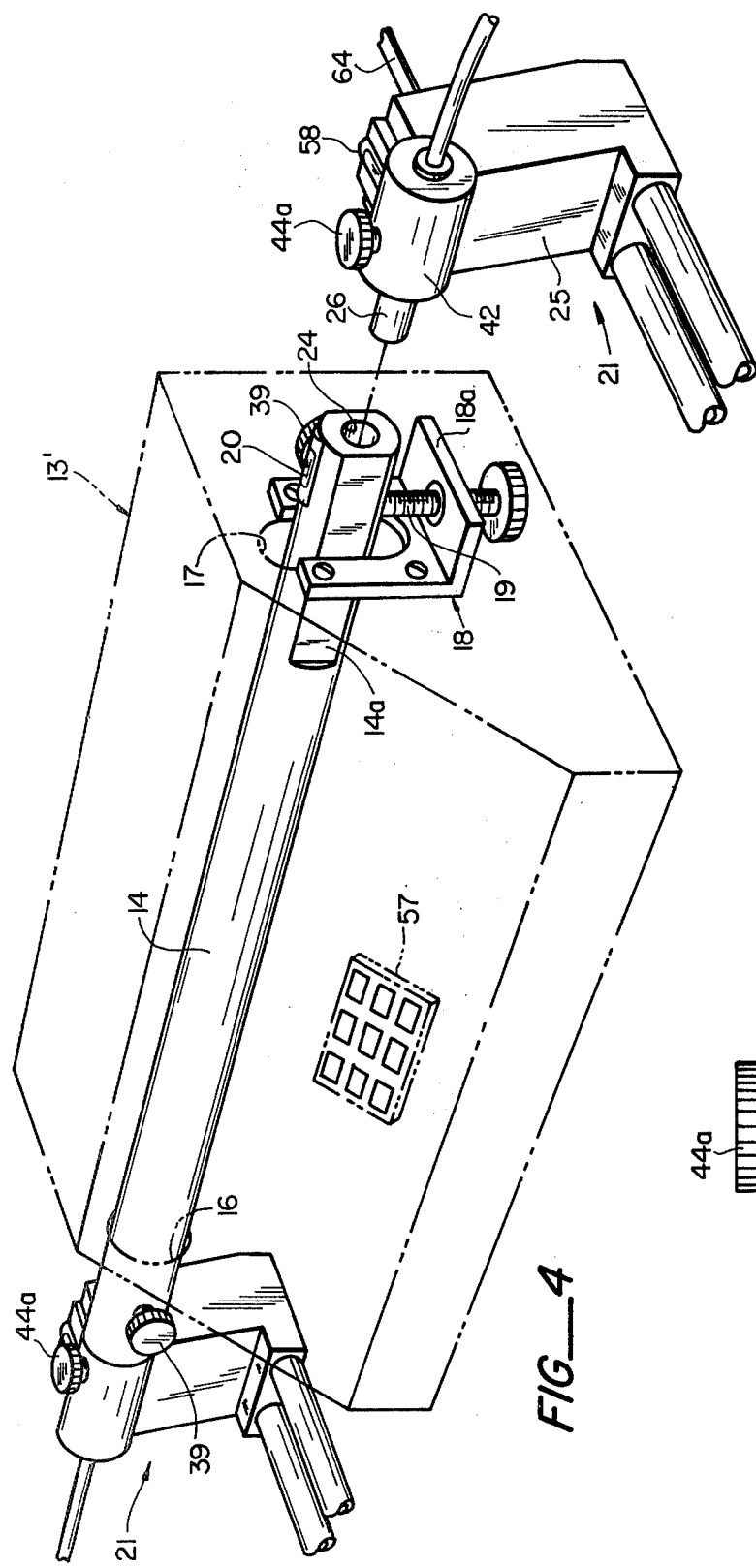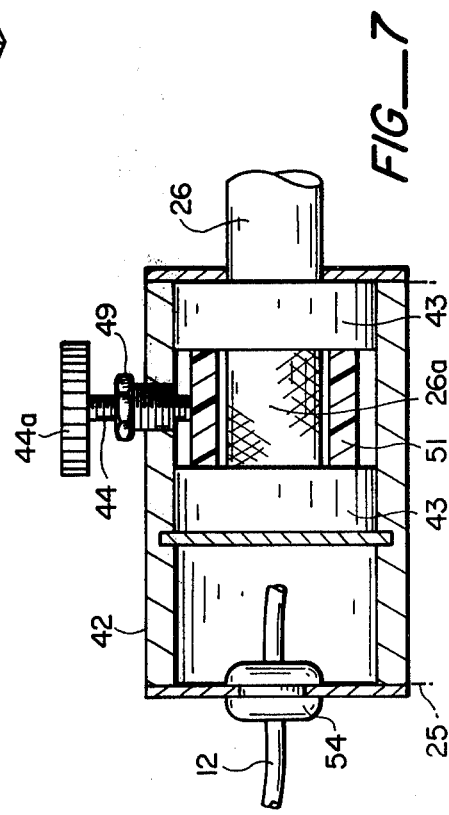

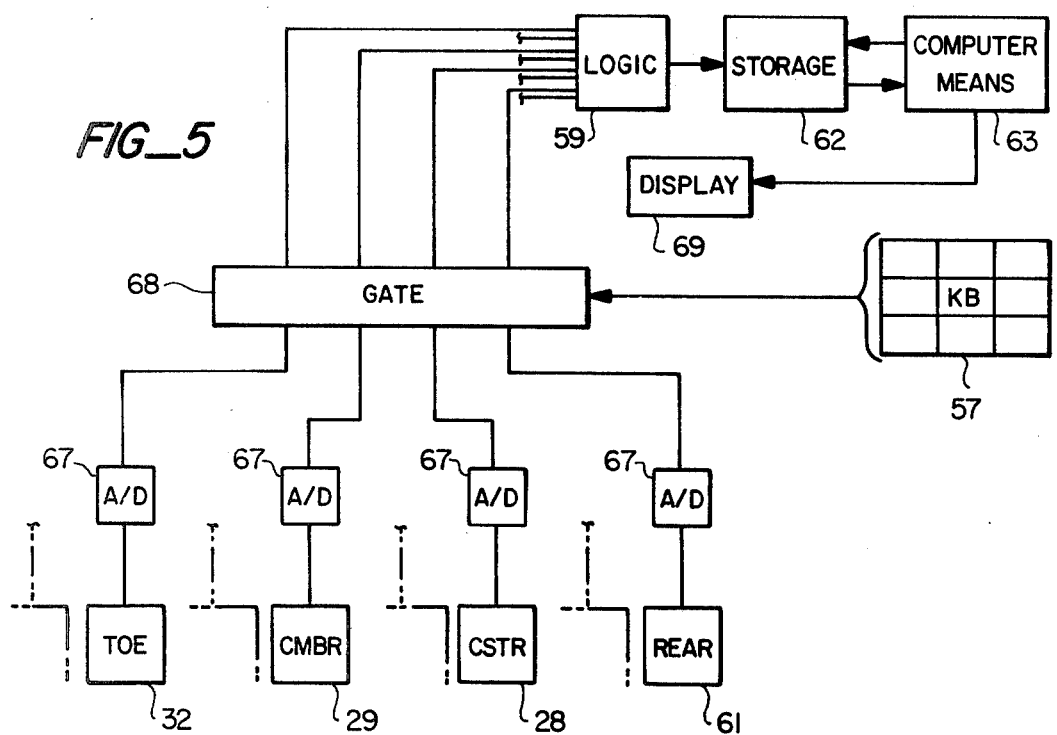
FIG_5
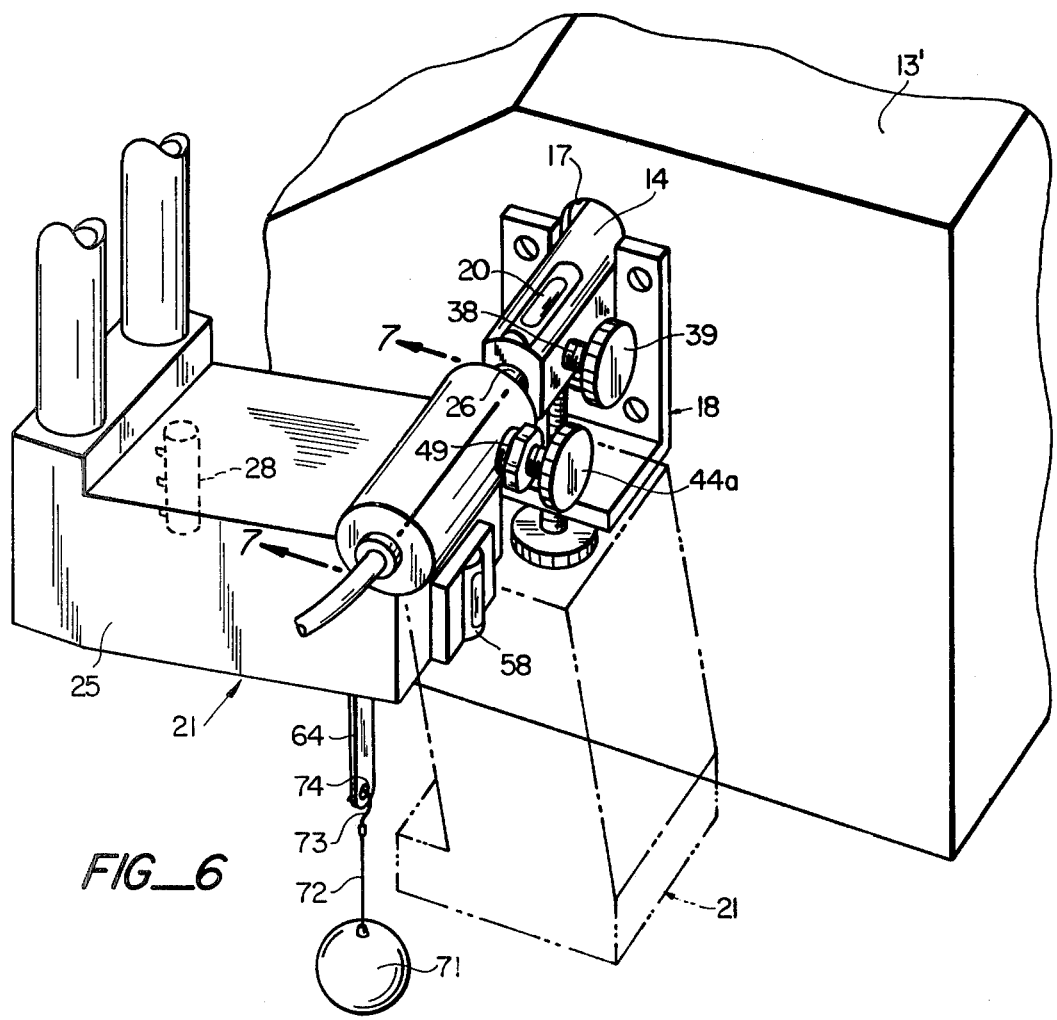
FIG_6

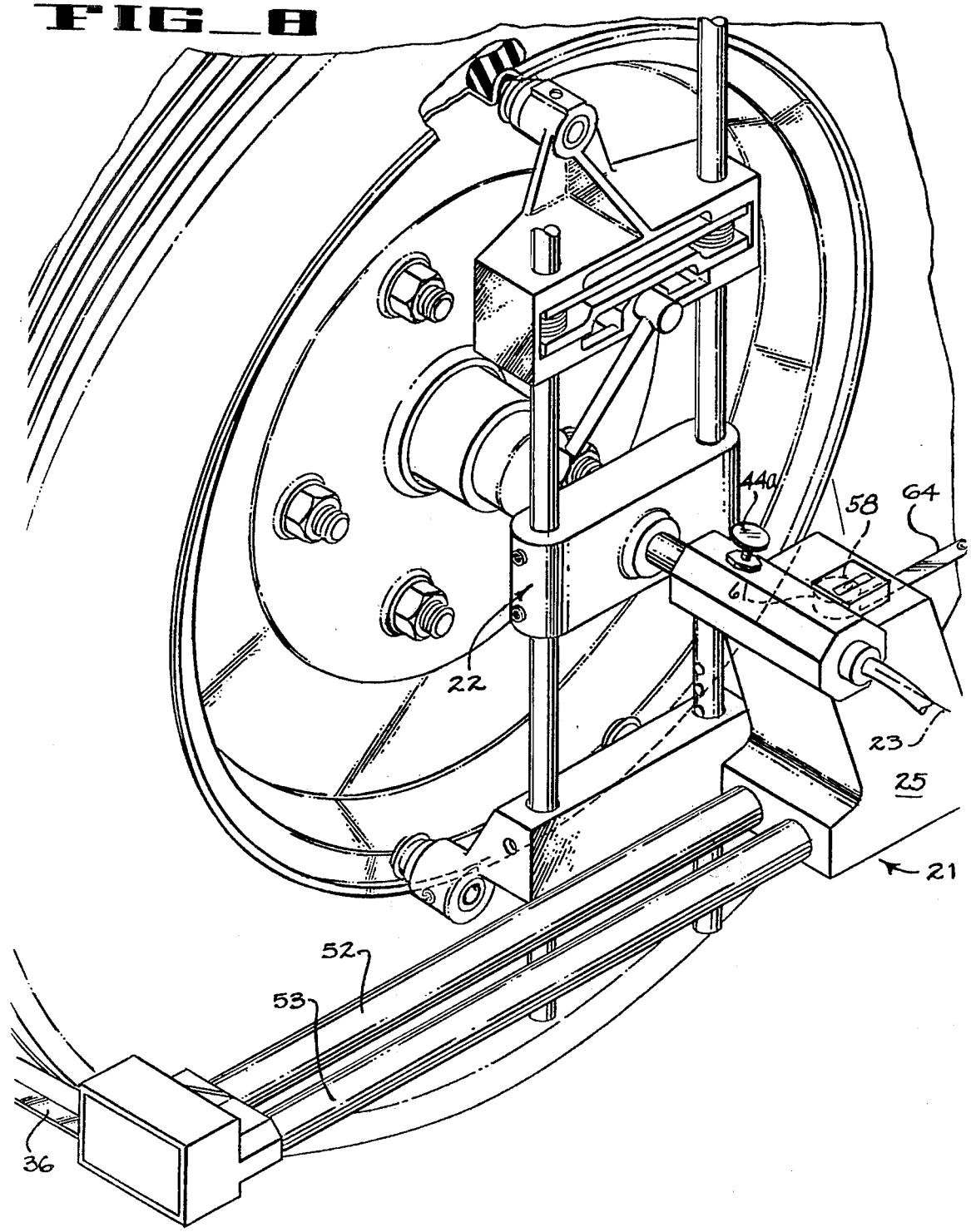

SYSTEM AND METHOD FOR CALIBRATING WHEEL ALIGNMENT SYSTEM SENSORS

BACKGROUND OF THE INVENTION

This invention pertains to wheel alignment systems and more particularly to a system and method for generating compensating offsets with respect to error from sensors. These compensating offsets provide correcting factors for computation of adjustments to be made to a vehicle when aligning the wheels thereof.

Heretofore, it has been difficult to provide accurate data from a wheel alignment system since the output from various sensors typically has varied in response to heat, age, the quality of the device itself, and other factors which have tended to provide inaccurate outputs. As disclosed herein correction factors are entered into a computer storage for use in conjunction with computations with respect to providing instructions for aligning wheels of a vehicle.

SUMMARY OF THE INVENTION AND OBJECTS

In general there has been provided a system of the kind described in which wheel alignment devices, such as transducer support assemblies, are carried in a predetermined fixed spaced relation in a horizontal plane established by means for moving the devices about a horizontal axis. The devices themselves include means for indicating a level state whereby upon disposing said transducer support assemblies in a horizontal plane, further means serves to lock the transducer support assemblies in fixed relation with respect to each other and in a horizontal plane. Means are provided for sampling the state of each of a plurality of sensors when the system is disposed in the previously stated known horizontal position. The sampled information is supplied to computer means for determining differences between signals actually received and signals which should otherwise have been received based on an accurate physical relationship.

In general it is an object of the present invention to provide an improved system and method for generating correction factors to be applied to readings taken from sensors in a wheel alignment system.

It is another object of the present invention to provide a system and method in which sensor elements having the utmost quality and accuracy and attendant expense need not be employed in order to provide at least equally accurate results.

Another object of this invention is to provide an improved system and method for detecting and compensating for error in the output from any given sensor in a wheel alignment system.

Yet another object of the invention is to provide an improved system and method for detecting error in the readout of a sensor for providing a rear wheel reference signal.

The foregoing and other objects of the invention will become more readily evident from the following detailed description of a preferred embodiment when considered in conjunction with the drawings.

BRIEF DESCRIPTION OF THE DRAWINGS

FIG. 1 shows a top plan view of a wheel alignment system of an improved type to be calibrated in accordance with the invention;

FIG. 2 shows a bottom perspective view in enlarged detail with a portion broken away of a toe sensor associated with the system of FIG. 1;

FIG. 3 shows in enlarged detail a rear perspective view with a portion broken away of a portion of the system shown in FIG. 1 disclosing sensors to be calibrated;

FIG. 4 shows a perspective view of apparatus for calibrating the sensors of the assembly of FIG. 1 according to the invention;

FIG. 5 shows a diagrammatic view of a system according to the invention;

FIG. 6 shows a perspective view of a portion of the apparatus shown in FIG. 4 disposed in a different orientation;

FIG. 7 shows an elevation section view of a brake taken along the line 7—7 of FIG. 6; and FIG. 8 shows an enlarged perspective view of a transducer mounting assembly 21 in position as carried from a wheel during alignment of a wheel.

DETAILED DESCRIPTION OF PREFERRED EMBODIMENT

In one wheel alignment system sensors for detecting pertinent physical positions of a wheel to be aligned are contained in a transducer support assembly 21 as shown in FIG. 3. Assembly 21 is slung pivotally in bearings from a wheel clamp assembly 22 carried by the vehicle wheel being aligned. Thus assembly 22 pivots about the axis 23 of the axle of its associated wheel whereby assembly 22 rotates with the wheel independently of assembly 21. Transducer support assemblies 21 disposed on each side of the vehicle (as shown in FIG. 1) include a head assembly 31 carried forwardly of the wheels at a position whereby a cable 47 can be coupled therebetween to cause each head assembly 31 to detect toe angle of a wheel in response to steering movements. Head assembly 31 is more particularly disclosed in FIG. 2 in which potentiometer 32 is carried within the housing 34. A thin flat flexible operating arm 36 is coupled at one end by screws 41 to an annular collar 37 formed with a central opening for receiving a wiper operating pin (not shown) centrally thereof. A set screw (not schown) carried by collar 37 serves to bind collar 37 to the wiper pin for rotation therewith.

As thus arranged movement of operating arm 36 serves to control the movement of a wiper associated with potentiometer 32 to provide electrical signals on lead 46 representative of toe movement.

Each support assembly 21 carries a tubular camber sensor 29 containing conductive fluid therein for operating a Wheatstone bridge device employing electrodes penetrating the sealed cylindrical body for generating information indicative of the camber of the wheel. Assembly 21 also includes a caster change sensor 28 of similar construction including leads 28a, b, c extending out of the tube of sensor 28 to be connected to a Wheatstone bridge (not shown). A rear wheel reference sensor device comprises the potentiometer 61 having a wiper pin engaged by a collar which, in turn, is rotated by rotational movement of the elongate operating arm 64. Arm 64 protrudes rearwardly of assembly 21 through the slot 65.

The forwardly extending parallel arms 52, 53 of each assembly 21 serve to support head assembly 31 as well as to provide a communication channel for leading a conductor 46 rearwardly from potentiometer 32. Camber sensor 29 and caster change sensor 28 are both disposed in a horizontal plane but in vertical planes which are substantially at right angles to one another.

From the foregoing it will be evident that information from both the right hand and left hand wheels of a vehicle can be sensed as to conditions of camber, toe, change in caster, and rear wheel reference. This information, when supplied, as for example in FIG. 1 by means of leads 11, 12 to suitable computer means as may be maintained in the console 13 serves to permit the computer to calculate a sequence of instructions to an operator so that the operator can follow the instructions and thereby align the wheels of the vehicle.

It is evident, however, that the computed instructions, generated on the basis of the input information can only be as accurate as the input information itself. Accordingly, as now to be described a system and method for calibrating wheel alignment systems, including systems of the type described above can be more readily appreciated with reference to FIGS. 4 through 8.

In a system of the kind described above cable 47 can, for example, be an elastic cable provided with hooks 56 at its opposite ends for engaging openings 48 in the ends of operating arms 36. Accordingly, as the wheels are subjected to steering movement the potentiometer 32 of each of the two assemblies 31 will provide an indication of the change in the angle from the 90° orientation shown. As a convention, when an operating arm 36 is disposed parallel to axis 23 (FIG. 8) potentiometer 32 should indicate zero. In the event that the wheels are oriented in a plane parallel with the centerline of the automobile and the arms are similarly parallel to the same plane a zero output should accordingly be represented.

In order to insure that the potentiometers 32 provide indication of a right angle state when the operating arm is, in fact, disposed at right angles to support arms 52, 53 means are provided for mounting a pair of assemblies 21 on a common axis and normal thereto in parallel spaced relation in a predetermined plane to determine the output from the sensors 32 in each of assemblies 31. As thus arranged, as shown in FIG. 4, an elongate rigid bar or rod 14 providing a predetermined space between a pair of assemblies 21 is carried to extend across and protrude at its ends out of the top portion of a console 13' comparable to that shown in FIG. 1. Accordingly, as shown in phantom lines in FIG. 4 the top portion of console 13' includes a first opening 16 at one end through which bar 14 extends and an elongate slot 17 flanked by a U-shaped bracket 18, the finger portions of which are attached to the outer side of console portion 13'. A transversely extending angle portion 18a carries an elongate screw 19 journaled therein. As thus arranged the bar is pivoted at its left end (as shown) by vertical movements imparted to the bar by screw 19.

Means for leveling bar 14 include the screw 19 and the spirit level 20 secured to the surface of bar 14 opposite screw 19.

Bar 14 includes flats 14a on opposite sides thereof to prevent bar 14 from rotating.

Means for supporting each of the two asemblies 21 from the opposite ends of bar 14 comprises a pair of aligned openings 24 for receiving mounting pins 26 therein.

Means for readily releasibly engaging pin 26 within axial opening 24 comprises the elongate screw 38 disposed normal to the axis of bar 14. The knob 39 is rotatable to move screw 38 into opening 24 in a direction normal thereto so as to engage pin 26 when disposed in opening 24.

Each assembly 21 includes means for mounting the assembly onto the outer end of pins 26 for rotation thereon or, as desired, in a locked position with respect thereto. Accordingly, as shown in FIGS. 4 and 7 the upper end of assembly 21 includes a bearing housing 42 comprising a pair of axially spaced bearings 43 carrying the end of pin 26 and flanking a knurled cylindrical surface portion 26a of pin 26. A screw 44 operated by a thumbwheel 44a is disposed by means of a fitting 49 to pass substantially radially inwardly of housing 42 and engage a relatively loosely fitting, pliant, brake element 51. Brake element 51 is preferrably of a tough material such as manufactured and sold under the trademark Delrin. Accordingly, when it is desired to lock assembly 21 in fixed relation to pin 26 the knurled knob 44a can be operated to apply pressure to brake element 51 and thereby bind the two bodies together.

As shown in FIG. 4 a grommet 54 is shown for carrying the cable 12 to computer console 13.

A keyboard assembly 57, conveniently disposed, for example, on the upper middle region of console 13' serves to control the entry of information from each of the sensors to a suitable computer means.

In operation each assembly 21 is mounted into the ends of bar 14 and clamped thereto by means of the knurled knobs 39. A cable 47 is disposed to couple the ends of operating arms 36. Bar 14 is then leveled by means of the adjusting screw 19 while observing the condition of spirit level 20. When bar 14 has been disposed precisely level camber sensor 29 should also have been leveled. Subsequently assembly 21 should be disposed in a level position by observing the state of spirit level 58 mounted atop transducer support housing 25.

The next step is to lock the assemblies 21 in a horizontal orientation. This is accomplished by releasing the knurled knob 44a to permit assembly 21 to rotate on the end of pin 26. Then by means of spirit level 58 assembly 21 can be leveled and locked to pin 26 by tightening knob 44a when a horizontal condition is indicated. Subsequently the toe line or cable 47 is inter-connected between the ends of operating arms 36.

At this point it is evident that camber sensor 29 should now provide an indication that it is precisely horizontal. In the event that the output from camber sensor 29 indicates that it is not horizontal the reading from camber sensor 29 is then employed as a compensating factor for computations made when the system is in operation. Accordingly, following the foregoing steps keyboard 57 is then employed to gate out the condition of camber sensor to a suitable logic unit 59 arranged for detecting the difference between the actual signal read from camber sensor 29 and zero (representing the horizontal position of camber sensor 29). This difference even if it is zero is recorded in the storage unit 62 to be available to suitable computer means 63 of the alignment system for computing adjustments to be made to an automobile to achieve appropriate camber.

In short, the signal that is detected by camber sensor 29 will then be considered to represent the state of assembly 21 when it is horizontal and corrections to signals from camber sensor 29 subsequently will be adjusted in order to compensate for any difference between zero and the output signal from the sensor.

With assemblies 21 disposed in the foregoing condition, toe sensor 32 also should provide a zero output since assemblies 21 are mounted on the axis of bar 14 in a fixed relation so as to protrude at right angles therefrom and since the length of support arms 52, 53 for all assemblies is the same, there should be no reason for the toe sensor 32 to be moved from a position of zero voltage. However, any deviation then existing will be transmitted to storage 62 under control of keyboard 57 to serve as a correction for later readings. Accordingly, the output or state of toe sensor 32 is first converted by an analog to digital converter 67 to provide a digital representation thereof at gate 68. Then, after bar 14 and assembly 21 have both been leveled keyboard 57 can be employed to gate signals from all sensors via their associated lines to logic unit 59 for determining differences between zero and the actual value which has been read. Thus, as noted above, any differences are supplied to storage 62 for use by computer means 63.

In addition to the foregoing the operation of gate 68 under control of keyboard 57 serves to transmit the sensed values of caster change sensor 28 and the rear wheel reference sensor 61 via similar channels through A/D converters 67', 67", gate 68 to logic unit 59.

As thus arranged computer means 63 will have available to it corrections which may need to be made with respect to any given sensor in order to provide an accurate output result on display unit 69.

In FIG. 5 four sensors are disclosed for toe, camber, caster and a rear wheel reference sensor whereas in reality it is readily evident that there are sensors on both sides of the automobile and these or other additional sensors are represented in FIG. 5 by the partial portions shown in phantom lines. It is believed that no further explanation is required with respect to these additional sensors.

From the foregoing it is evident that rear wheel reference sensor 61 will not have been calibrated by the foregoing procedures. Accordingly, it is necessary to disconnect cable 47', release brake element 51 by means of knurled knob 44a and then rotate assembly 21 substantially 90° upwardly followed by locking assembly 21 in that position. Subsequently a weight 71 is attached to operating arm 64 by means of a flexible line 72 and hook 73 engaging the opening 74 in the end of arm 64. In this arrangement operating arm 64 should be drawn to a vertical position. At that point the condition of sensor 61 can be gated into logic 59 to detect any differences which may exist between the vertical as indicated by the direction of operating arm 64 and the signal detected from sensor 61.

The positioning of assembly 21 in an upright position need not be precisely vertical since it is only necessary to permit operating arm 64 to move freely in slot 65.

From the foregoing it will be readily evident that there has been provided an improved system and method for calibrating the sensors of a wheel alignment system so as to compensate for the effects of heat, age or mechanical deformation of the components.

I claim:

1. In a system for calibrating a wheel alignment system of a type having a plurality of sensors for detecting a plurality of types of input information to be used for computing adjustments to be made to a vehicle for aligning the wheels thereof comprising an elongate rigid bar, means for readily releasably coupling first and second sensor support assemblies to pivot co-axially of opposite ends of said bar, means for moving an end of said bar between raised and lowered positions relative to the other end of said bar to dispose the axis of said bar in a horizontal plane, means responsive to the movements of said bar for indicating when said bar has been moved into said horizontal plane, means carrying said support assemblies to pivot about the axis of said bar to dispose said support assemblies in a horizontal plane parallel to the first named plane, means for locking said assemblies in the last named horizontal plane, means for indicating the disposition of said support assemblies in said last named horizontal plane, means for providing a predetermined information reference representing a predetermined position of said sensors and means for detecting the difference between the information detected by said sensors when in said horizontal plane and a predetermined reference representing a predetermined position of said sensor to provide a correction factor to be associated with said sensors when used to align the wheels of a vehicle.

2. In a system for calibrating a wheel alignment system of a type having sensor means for detecting input information to be used for computing an adjustment to be made to a vehicle for aligning the wheels thereof comprising an elongate rigid bar, means for readily releasably coupling first and second sensor support assemblies to pivot co-axially of opposite ends of said bar, means for moving an end of said bar between raised and lowered positions relative to the other end of said bar to dispose the axis of said bar in a horizontal plane, means responsive to the movements of said bar for indicating when said bar has been moved into said horizontal plane, means carrying said support assemblies to pivot about the axis of said bar to dispose said support assemblies in a horizontal plane parallel to the first named plane, means for providing a predetermined information reference representing a predetermined position of said sensors, means for indicating and means for locking the disposition of said support assemblies in said last named horizontal plane, and means for detecting the difference between the information detected by said sensor means when in said horizontal plane and a predetermined reference information representing a predetermined position of said sensor to provide a correction factor to be associated with said sensor means when used to align the wheels of a vehicle.

3. In a method for calibrating a wheel alignment system of a type having liquid sensor means carried in a support assembly serving to detect input information to be used for computing an adjustment to be made to a vehicle for aligning the wheels thereof comprising the steps of mounting sensor support assemblies co-axially in fixed spaced relation to each other, leveling an axis defined between said support assemblies to dispose the liquid of the sensor means in a horizontal plane, moving said sensor support assemblies to dispose liquid maintained in the sensor means in a horizontal plane, detecting the state of the sensor means in the support assembly, comparing the information detected from the state of the sensor means with the physically correct information for the same position of said sensors to provide a compensating correction to be considered during use of the sensor means.

4. In a method for calibrating a wheel alignment system of a type having a rear wheel reference sensor carried in a support assembly mounted in pivotal relation on the axis of rotation of a wheel to be aligned and wherein said rear wheel reference sensor includes an elongate operating arm protruding rearwardly from said assembly and movable for varying the output of said sensor to provide input information to be used for computing an adjustment to be made to a vehicle for aligning the wheels thereof comprising the steps of rotating the support assembly to dispose said operating arm to hang substantially vertically downwardly, adding a substantial weight to the end of said operating arm, detecting the state of the sensor and comparing the information detected from the state of the sensor with physically correct information for the same position of said sensor to provide a compensating correction to be considered during use of the sensor.

5. In a system for calibrating a wheel alignment system of a type having sensor means for detecting input information to be used for computing an adjustment to be made to a vehicle for aligning the wheels thereof comprising sensor support assemblies adapted to be carried by an associated wheel, an elongate fluid sensor carried by each of said assemblies, mounting means carrying each said assembly for pivotal movement about the axis of the axle of a wheel carrying said support assembly, said elongate fluid sensors lying in a plane transversely of said axis, each said support assembly carrying means for indicating a level state of fluid in said fluid sensor, and each said support assembly including readily engagable locking means serving to engage said mounting means for securing its associated support assembly in a position disposing said sensor thereof in a horizontal plane, means providing a predetermined reference information for said sensors, and means for detecting the difference between information detected from said sensors when locked in a horizontal plane and said reference information to provide a correction factor to be associated with said sensors when used to align the wheels of a vehicle.

6. In a system for calibrating a wheel alignment system of a type having a sensor for detecting input information with respect to the angle of toe to be used for computing adjustments to be made to a vehicle for aligning the wheels thereof comprising an elongate rigid bar, means for readily releasably coupling first and second sensor support assemblies co-axially to opposite ends of said bar and to pivot therearound, said assemblies carrying elongate portions disposed at right angles to said bar, means for moving one end of said bar with respect to the other end of said bar to dispose the axis of the bar horizontally, means carried by said bar for indicating the horizontal orientation of the bar, means carried by each of said sensor support assemblies for indicating the horizontal orientation of said assemblies, means for pivotally carrying said support assemblies about the axis of said bar, means for locking said assemblies in a horizontal orientation as detected by said indicating means, each of said assemblies including a toe sensor including an elongate operating arm extending in spaced parallel relation to said bar, sensor means operated by movement of said arms, means interconnected between the free ends of said arms serving to yieldingly draw said arms toward each other, means serving to establish a predetermined information reference representative of the orientation of said sensors when disposed precisely parallel to said bar, and means for comparing the information detected by at least one of said sensors when said arms are so drawn to said reference to provide a correction factor to be associated with said sensors when used to align the wheels of a vehicle.

* * * * *